May 31, 1932.　　　R. McANDREW　　　1,861,314
MAIN FERRULE FOR CONNECTING BRANCH PIPES
Filed May 18, 1931
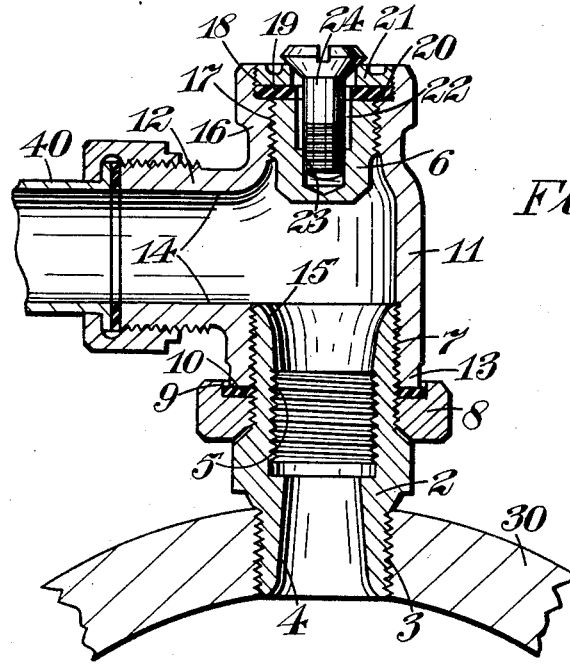
Fig.1.
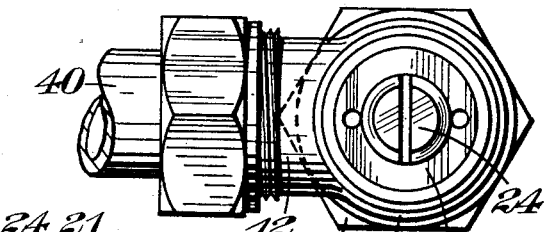
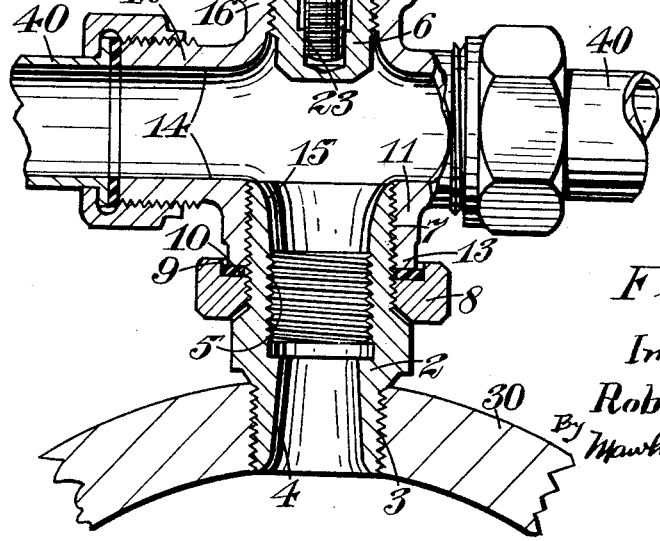
Fig.2.
Fig.3.
Inventor:
Robert McAndrew,
By Mawhinney & Mawhinney,
Attys.

Patented May 31, 1932

1,861,314

UNITED STATES PATENT OFFICE

ROBERT McANDREW, OF COVENTRY, ENGLAND

MAIN FERRULE FOR CONNECTING BRANCH PIPES

Application filed May 18, 1931, Serial No. 538,300, and in Great Britain May 30, 1930.

This invention relates to a ferrule, for connecting a branch pipe to a main, of the kind including a body portion having an outlet adapted for attachment to a branch pipe and a nipple portion for connection to the main, which portions are connected together so that they can be adjusted angularly and locked in a desired position, the nipple being adapted so that it can be inserted into a water, gas or other main when full and under pressure by a machine in known manner. The main object of the invention is to provide an improved construction of ferrule which will be very efficient, and can be adjusted to suit various requirements.

According to this invention, the nipple and body portions are connected together so as to be adjustable axially as well as angularly relatively to one another. By this means the body can be locked on the nipple at a selected height.

Preferably the nipple has a venturi or streamline water-way, so that more than one branch passage can be supplied from the single nipple without appreciably decreasing the delivery from either branch outlet.

In the accompanying drawings,

Figure 1 is a central vertical section of a ferrule constructed in accordance with the invention, Figure 2 is a plan, and Figure 3 is a view similar to Figure 1 showing a modification.

The nipple 2 is a relatively short sleeve screw-threaded at 3 for attachment to a main 30 by the aid of a machine in the known manner. The bore of the nipple is substantially of venturi or stream-line shape as at 4, 15, and is formed with a screw-threaded part 5 into which a sealing plug 6 can be screwed during the insertion of the nipple into the main, or at subsequent times when it is desired to stop the flow through the nipple.

The upper external surface of the nipple is also screw-threaded at 7 to receive a nut 8 having an annular recess 9 in its upper surface wherein a jointing washer 10 is mounted. On to the threaded part 7 is also screwed the body 11 of the ferrule, which is provided with a lateral passage 12 adapted for attachment to a branch pipe 40. The passage 12 is so located from the lower end 13 of the body that the bore 14 is not obstructed by the mouth 15 of the nipple by any up and down adjustment of the body.

Beyond the passage 12 the body is continued at 16 and formed internally with a threaded part 17 corresponding to that of the plug and with a counterbored threaded portion 18. In this counterbored portion is located a resilient washer 19 retained in position against the shoulder 20 by a threaded locking-ring 21. The inner periphery of the washer is of smaller diameter than that of either the threaded part 17 or the ring 21 so that there is a margin of the washer which is not gripped.

The plug 6 is formed with a non-circular recess 22 terminating at the lower end in a threaded portion 23.

When the nipple 3 is being inserted into the main, the only other part of the ferrule in use is the plug 6 which is screwed into the part 5 to seal the outlet of the nipple. After this operation the lock nut 8 and then the body 11 are screwed on to the nipple and the passage 12 is locked in the desired direction by tightening the lock-nut on to the lower end of the body.

When the branch pipe 40 has been attached to the passage 12 the plug 6 can be withdrawn from the nipple by an operating key of known type which engages the recess 22 and be then screwed into the threaded part 16 so that it compresses the washer 19 against the ring 21 and forms a leak-proof joint. A set-pin 24 the head of which engages the ring 21 is screwed into the threaded part 23 and locks the plug in this position. When moving the plug up or down the inner periphery of the washer 19 fits tightly on the stem of the operating key so that leakage is prevented at this point. Instead of the washer 19 a flexible conical packing could be used so arranged that the pressure would force it into contact with the key.

The substantially stream-line water-way in the nipple 2 enables a second branch 40, as shown in Figure 3, to be connected to the body without restricting the delivery from either branch outlet.

It will be seen that a very compact and inexpensive form of leak-proof ferrule is provided having but few parts and water-ways which are not liable to become easily obstructed.

What I claim as my invention and desire to secure by Letters Patent of the United States is:—

1. A device for connecting a branch pipe to a main comprising a relatively short nipple having a streamline internal bore, a ferrule secured for rotary adjustment upon said nipple and having a lateral outlet for connecting with the branch pipe, the lower portion of said outlet extending in any position of adjustment above the mouth of the nipple, and means between said ferrule and nipple for securing the ferrule in adjusted position.

2. In a device for connecting a branch pipe with a main, a very short nipple having a venturi interior bore and with external screw threads, a ferrule having a threaded socket for rotatably engaging the threads upon the nipple whereby the ferrule may be applied to the nipple and angularly adjusted thereon, said ferrule having a lateral passage communicating with the branch pipe, the lower portion of the lateral passage being above all parts of the upper portion of the nipple to provide an unrestricted flow in any angular position of the ferrule, and separate means run on the threads of the nipple for having binding engagement against the socket of the ferrule to lock the ferrule in angularly adjusted position.

3. In a device for connecting a branch pipe with a main, a short streamline nipple secured to the main, a ferrule angularly adjusted upon the nipple and having a lateral passage the lower portion of which is above all parts of the nipple, said ferrule having an upper extension in line with the nipple, a plug carried in said extension and adapted to be let down into the nipple, said extension having a counter-bore above the plug, a washer adapted to extend across said plug and the counter-bore, a ring in the counter-bore above the washer, and means detachably engaged with the plug and axially movable with respect to the plug for engaging said ring.

In testimony whereof I have signed my name.

ROBERT McANDREW.